(12) United States Patent
Battles

(10) Patent No.: US 6,839,513 B1
(45) Date of Patent: Jan. 4, 2005

(54) PHOTOGRAPHY METHOD THAT PROTECTS AGAINST PHOTOGRAPHER ERROR

(75) Inventor: Amy E. Battles, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 107 days.

(21) Appl. No.: 10/681,673

(22) Filed: Oct. 7, 2003

(51) Int. Cl.[7] .................................................. G03B 7/00

(52) U.S. Cl. ........................ 396/213; 396/266; 348/362

(58) Field of Search .................................. 396/213, 222, 396/266; 348/362–366

(56) References Cited

U.S. PATENT DOCUMENTS 4,811,042 A * 3/1989 Cloutier et al. ............. 396/213

* cited by examiner

Primary Examiner—W. B. Perkey
(74) Attorney, Agent, or Firm—David W. Boyd

(57) ABSTRACT

A camera takes two photographs for a single actuation of its shutter release. One of the photographs uses the camera settings specified by the user, and the other photograph uses camera settings automatically selected by the camera. The taking of the second photograph may optionally be disabled by the camera user. The taking of the second photograph may optionally occur only if the user-specified settings differ, or differ significantly from the automatically-determined settings. The camera may optionally be a digital camera.

26 Claims, 3 Drawing Sheets

US 6,839,513 B1

PHOTOGRAPHY METHOD THAT PROTECTS AGAINST PHOTOGRAPHER ERROR

FIELD OF THE INVENTION

The present invention relates generally to photography.

BACKGROUND OF THE INVENTION

Modem cameras often provide many features and adjustments that allow photographers extensive control over the camera's operation and the photographs that result. Many cameras also provide an "automatic" or "program" mode that automatically selects camera settings that are likely to produce an acceptable photographic result, but gives the user little creative control over the camera's operation.

While knowledgeable photographers can use a camera's features and adjustments to good advantage, novice camera users may be intimidated or confused by the array of choices presented to them. The novice user may come to rely on the camera's automatic mode exclusively out of fear of making mistakes in manually choosing other settings. In that case, the novice loses the learning experience that may come from experimenting with other camera settings, and fails to take full advantage of the camera's capabilities.

Alternatively, the novice user may experiment with the camera's settings and features, and in fact make mistakes that ruin the resulting photographs.

A camera and photography method are needed that allow camera users to freely adjust and experiment with their cameras, while protecting against the irretrievable loss of photographic opportunities.

SUMMARY OF THE INVENTION

A camera takes two photographs for a single actuation of its shutter release. One of the photographs uses the camera settings specified by the user, and the other photograph uses camera settings automatically selected by the camera. The taking of the second photograph may optionally be disabled by the camera user. The taking of the second photograph may optionally occur only if the user-specified settings differ, or differ significantly from the automatically-determined settings. The camera may optionally be a digital camera.

DETAILED DESCRIPTION OF THE PREFERRED EMBODIMENT

Figure 1:
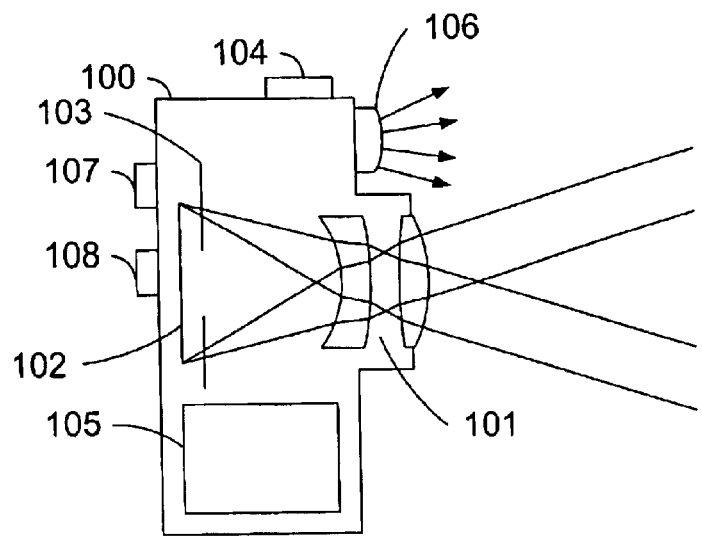
FIG. 1 depicts a schematic cutaway view of a camera in accordance with an example embodiment of the invention.

FIG. 1 depicts a schematic cutaway view of a camera 100 in accordance with an example embodiment of the invention. Lens 101, which may be an integral part of camera 100 or may be an interchangeable component, gathers light from a scene and redirects it so that an image of the scene falls on image surface 102.

If camera 100 is a traditional film camera, then image surface 102 is the light-sensitive portion of photographic film. In that case, an image of the scene is recorded on the film when scene light causes chemical changes in the film.

If camera 100 is a digital camera, then image surface 102 is typically an electronic array light sensor, such as a charge-couple device (CCD) sensor or a complementary metal oxide semiconductor (CMOS) sensor. Typically, light impinging on an electronic array light sensor causes electrical charge to accumulate in proportion to the intensity of the light in light-sensitive sites called "pixels". After charges have been allowed to accumulate for a time, the charges are measured and the resulting measurements are collected into an ordered numeric array, sometimes called a digital image, a digital photograph, or simply an image or a photograph.

Typically, the amount of time that light is permitted to impinge on the image surface 102 is controlled by a shutter 103, which operates in response to a signal generated when the photographer fully depresses a shutter release button 104. Typically, exposure is controlled by controlling the time, called the exposure time, for which light is allowed to reach image surface 102. FIG. 1 depicts a focal-plane curtain shutter, which sweeps a calibrated opening just in front of the image surface 102 in response to the shutter release signal. Alternatively lens 101 may contain a leaf shutter, which opens an aperture within lens 101 in response to the shutter release signal. In the case of a digital camera, some digital photographs may be taken using entirely electronic control of the electronic array light sensor to control the exposure time, a process called electronic shuttering. Even in this case, control 104 is typically still called a shutter release button, even though no physical shutter may be involved.

The camera user may indicate that a photograph is to be taken in other ways as well. A "remote shutter release" may be used that connects to the camera, and provides an electronic or mechanical signal equivalent to pressing the shutter release button 104. Some camera systems include a wireless remote control that allows the user to initiate the taking of a photograph from some distance away from the camera. Such a remote control may operate using optical or electromagnetic signals, and is often used when the photographer wishes to include herself in a photograph.

Camera 100 also comprises a control unit 105. Control unit 105 may contain a microprocessor system with appropriate memory and control circuitry, dedicated electronic hardware, or a combination of these. Control unit 105 typically detects and interprets the photographer's operation of various camera controls, including shutter release button 104, and actuates the various parts of camera 100. For example, control unit may orchestrate automatic focusing, determine proper exposure, actuate shutter 103, and communicate various information to the photographer.

If camera 100 is a digital camera, control unit 105 also controls the electronic array light sensor, performs the measurements and computations necessary to construct digital images from the electrical charges accumulated in the electronic array light sensor, and stores the resulting digital images in a memory. Control unit 105 may also show images on a display built into the camera, and may communicate digital images through an interface to a computer or other electronic device. Control unit 105 may also be capable of modifying digital images using various image processing techniques.

Camera 100 may also comprise a strobe 106, sometimes called a flash unit, that can emit a burst of light on demand to enhance the illumination of the scene. Strobe 106 may be useful, for example, for supplying light to very dark scenes in order to make them successfully photographable, or for allowing shorter exposure times, thus enabling a pleasing photograph in a situation where camera or subject motion might otherwise ruin a photograph. Typically, several modes of strobe operation are provided, and may include always off, always on, automatic, and red-eye reduction modes.

Camera 100 also comprises various other user controls, of which controls 107 and 108 are representative. The user controls may comprise buttons, dials, switches, knobs, rocker switches, menus, or other means for communicating information to camera 100. The camera settings that the user controls may adjust include the aperture size that is used, the exposure time, whether a strobe is used and in what mode, metering modes, film speeds, and many other settings. Camera 100 also provides an "automatic" or "program" mode in which the camera selects the settings based on an internal program in an effort to ensure that a pleasing photograph is taken. The user can typically select the automatic or program mode using a dial or button on the camera 100.

Situations in which the present invention can be used to good advantage may arise in various ways, often through mistake, inadvertence, or forgetfulness on the part of the camera user. For example, many cameras provide several selectable metering modes. These modes often include a "full frame" mode, also sometimes called an "average" or "matrix" mode, wherein the camera considers all parts of the scene equally in evaluating the scene brightness used to choose exposure settings such as exposure time and lens aperture. A full frame mode is often used in landscape photography. Also usually provided is a "spot" metering mode, wherein the camera considers only a small portion of its field of view in selecting exposure settings. A "spot" metering mode is commonly used in portrait photography.

Figure 2:
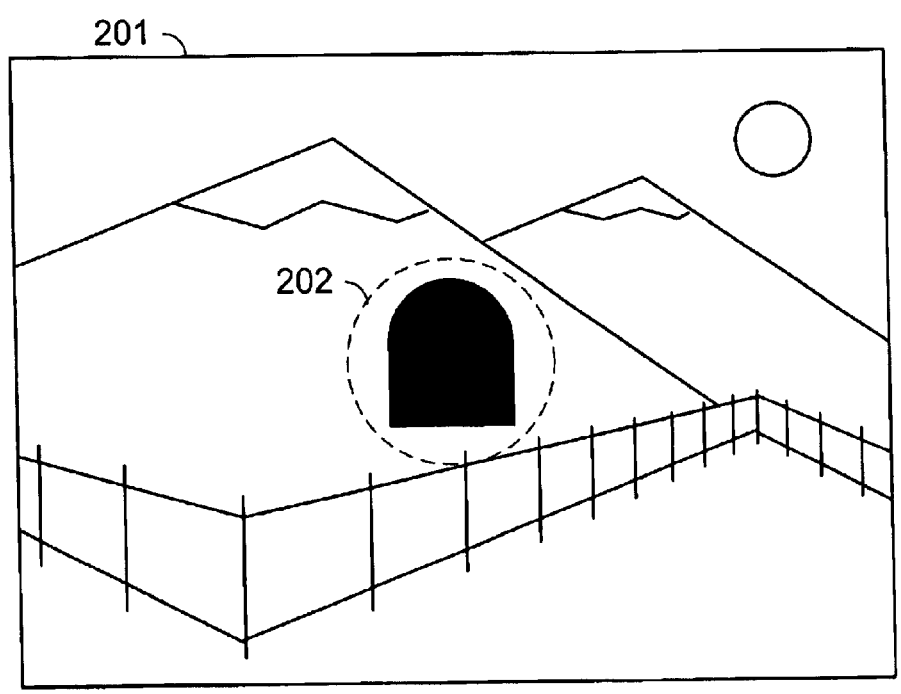
FIG. 2 shows a schematic representation of a camera's viewfinder.

A photographer who has set the camera to spot metering for a portrait sitting may forget to change the metering mode in preparation for a later landscape photograph. The landscape photograph may easily be ruined if an unusually bright or dark landscape feature happens to fall in the portion of the camera's field of view evaluated in the spot metering mode. For example, FIG. 2 shows a schematic representation of a camera's viewfinder 201. The viewfinder 201 may be a dedicated optical system that gives the photographer an approximate representation of the field of view of the camera's lens 101, may use lens 101 to show the photographer exactly what camera lens 101 sees (as in a single lens reflex camera), or may be an electronic display. In FIG. 2, the scene area considered in spot metering mode is indicated by the dashed circle 202 in the center of the viewfinder. In this scene, a dark cave entrance is by chance in the center of the scene. In spot metering mode, the camera will likely lighten the photograph to compensate for the dark cave that dominates its metering area. The photographer's mistake or forgetfulness will likely result in a ruined photograph, in which most of the scene is overexposed.

In matrix or full frame metering mode, which is more appropriate for this scene, and which is likely the setting the camera would choose in its automatic mode, the entire mountain scene would be considered in setting the exposure, and a more pleasing photograph would likely result.

A camera in accordance with an example embodiment of the invention protects the photographer against this kind of error. When the photographer indicates, for example by fully depressing the shutter release button 104, that a photograph is to be taken, the camera takes a photograph with all camera settings as specified by the photographer, and also takes a second "backup" photograph that uses the camera settings that are chosen by the camera's automatic or program mode. For example, in photographing the example scene of FIG. 2, even if the photographer inadvertently leaves the camera in spot metering mode and thus ruins the intended photograph, the camera ensures that a pleasing photograph is taken by taking the second, automatically-adjusted, backup photograph.

Because the most time-consuming parts of the camera's preparation for a photograph, including focusing and exposure determination, are completed when the first, user specified, photograph is taken, the backup photograph can be taken very soon after the first, so that there is very little time penalty associated with having this feature enabled. The order of the photographs may be reversed without any loss of generality.

Examples of other camera settings that may be the cause of similar errors include the camera's aperture setting, exposure time setting, flash mode, film ISO speed setting, exposure compensation mode, or other settings. Errors made with any of these settings can be protected against by a camera that takes a second, automatically adjusted, backup photograph when the camera user takes a first, user-specified, photograph.

Such a feature is especially well suited for embodiment in a digital camera. In a digital camera, no film is consumed by the second photograph, and the extra storage space consumed can be easily freed by deleting any incorrect user-specified photographs or unnecessary backup photographs. A digital camera may be able to take its second backup photograph more quickly after the first user-specified photograph because there is no need for transporting film out of the camera's image area. And finally, digital cameras may present further opportunities for mistakes not found in film cameras.

For example, some digital cameras provide a "white balance" setting designed to compensate for the spectral characteristics of different scene illuminants. Photographing the same subject under fluorescent light, incandescent light, and sunlight will result in three photographs that can look dramatically different, unless a correction is made for the difference in scene lighting. Often, uncorrected photographs taken under artificial lighting will look unnatural, with distorted colors. Many cameras perform the white balance correction automatically, but also allow the photographer to inform the camera before taking a photograph what the scene illuminant is, to ensure that the proper correction will be applied.

Of course, this feature provides another opportunity for photographer error. If the photographer remembers to set the white balance to compensate for fluorescent lighting for in indoor session under fluorescent lights, and then forgets to change it for a later photograph taken under incandescent light, the later photograph will likely be ruined, having unnatural-looking, distorted colors. Having the camera take a second, backup photograph in each instance will protect against this error, because the camera will apply its automatic illuminant detection in the later situation, and likely apply the correction needed for incandescent lighting.

Other variations and improvements are also possible. In a second example embodiment, camera 100 compares the user-specified settings with the settings chosen by its automatic mode, and takes the second, backup photograph only if the two sets of settings differ, or differ significantly. If the sets of settings are identical, then there is no need for the second, backup photograph. If the sets of settings differ slightly, the camera may still determine that they are similar enough that a backup photograph is not needed. For example, the photographer may choose an aperture of f/6.7 and an exposure time of 1/350 seconds, while the automatic program may select an aperture of f/8 and an exposure time of 1/250 seconds, all other settings being identical. In this case, the net exposure is identical, and the slight differences in depth of field and subject motion blur that might occur in the resulting two photographs are so slight that it is probably not worth taking a backup photograph, especially in a film camera. The automatic mode has selected an aperture that is ½ of a photographic "stop" slower than the photographer selected, but has compensated with an exposure time that gives ½ of a photographic "stop" more exposure. (A photographic "stop" corresponds to a factor of two in total exposure.) The camera may, for example, determine that if the total exposure indicated by the user differs by less than 1 stop from the exposure indicated by the camera's automatic program, and neither the aperture setting nor exposure time differs by more than ½ stop between the two, then no backup photograph is necessary if all other settings are identical. Other decision-making rules may be used within the scope of the appended claims.

In another example embodiment, the camera user can enable or disable the backup photograph feature. For example, as a photographer gains confidence and experience, she may decide that the extra, backup photographs are not worth the additional cost that they incur, because the number of errors they protect against is simply too small. This may be especially true if the camera is a film camera.

Figure 3:
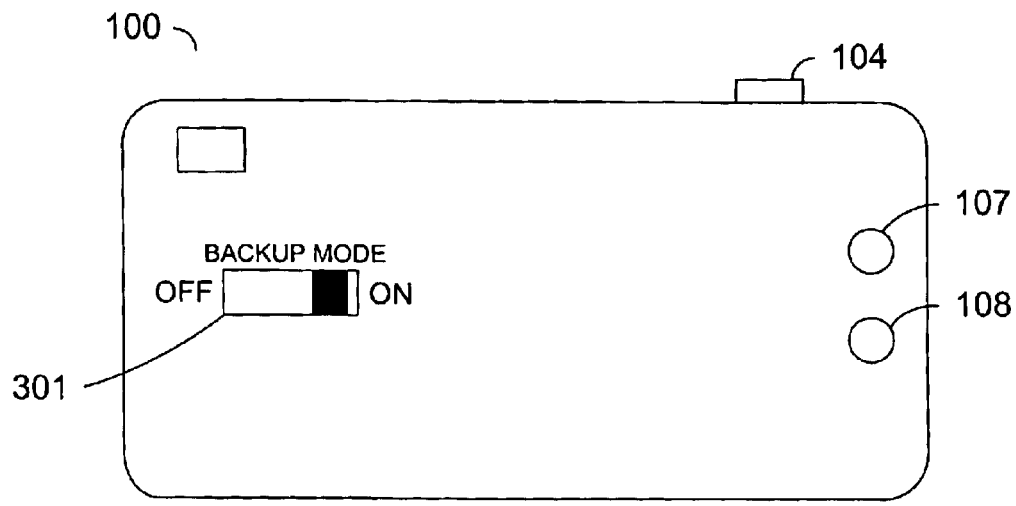
FIG. 3 illustrates one method for enabling and disabling a backup photograph feature.

FIG. 3 illustrates one method for enabling and disabling the backup photograph feature. A switch 301 on camera 100, shown in rear view, allows the camera user to specify whether backup photographs should be taken or not. The camera's control unit 105 senses the position of switch 301, and adjusts the camera's functioning accordingly.

Figure 4:
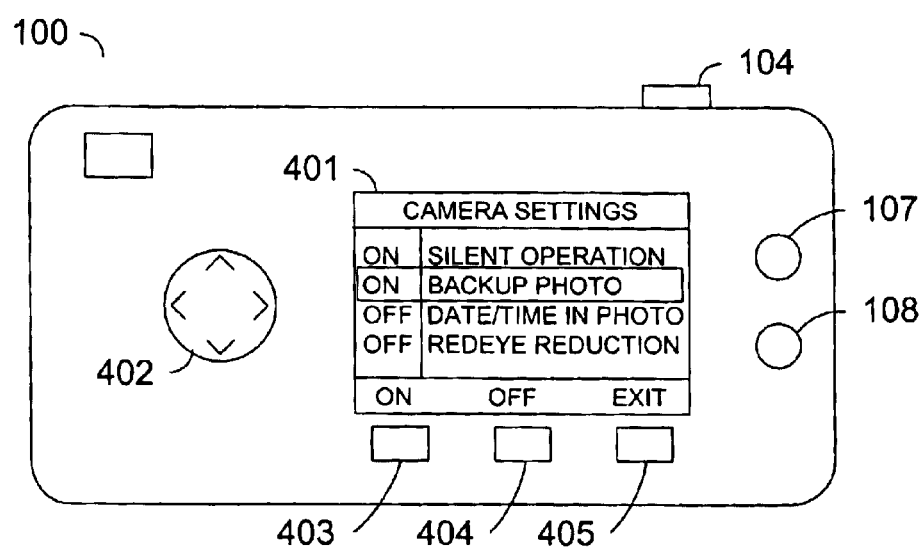
FIG. 4 illustrates a second method for enabling and disabling the backup photograph feature.

FIG. 4 illustrates a second method for enabling and disabling the backup photograph feature. In this method, camera 100 is a digital camera and has a user interface that allows the user to interact with the camera through a set of menus shown on a display 401 that is part of camera 100. The user may navigate the menus using various controls such as rocker switch 402, and make menu selections using controls such as buttons 403, 404 and 405. In the example menu shown in FIG. 4, the user uses rocker switch 402 to select which setting to adjust. Once a setting is selected, the particular camera behavior is turned on by pressing button 403, or turned off by pressing button 404. The current status of the setting is shown in display 401. In the example display, the user has enabled the taking of backup photos. This particular menu is exited by pressing button 405.

The menu and controls shown in FIG. 4 are merely illustrative. One of skill in the art will recognize that many other combinations of messages and controls may be used, within the scope of the appended claims, to enable and disable a backup photograph feature. By way of example, the feature could be called something other than a backup photograph feature. It might also be called an "extra default picture mode", "insurance mode", "fool proof mode", "mistake protection", or any other suitably descriptive name.

Figure 5:
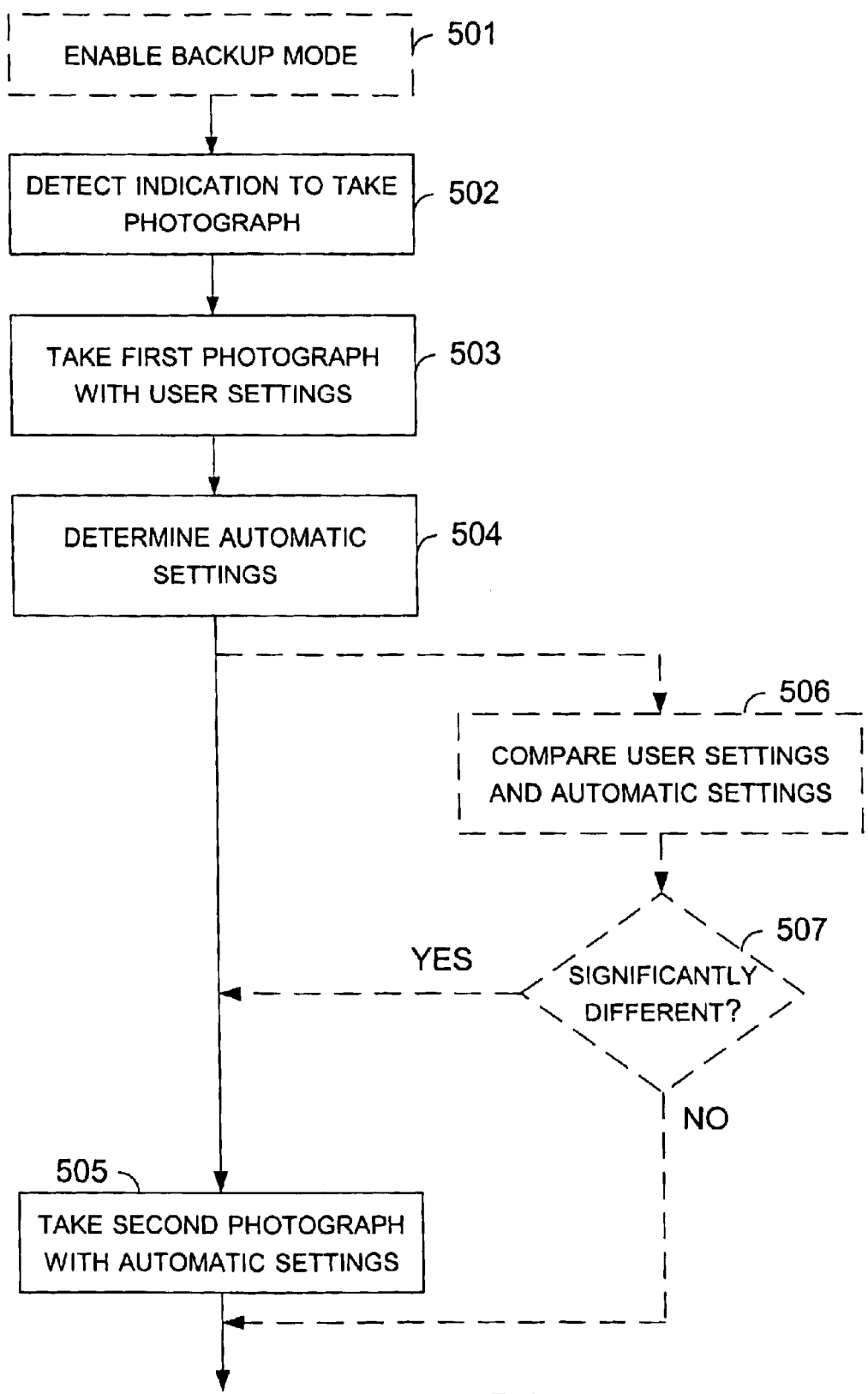
FIG. 5 illustrates a method of photography in accordance with an example embodiment of the invention.

FIG. 5 illustrates a method of photography in accordance with an example embodiment of the invention. In step 502, a user indication that a photograph is to be taken is detected. For example, the user indication may be that the user has pressed the shutter release button 104. In step 503, a first photograph is taken using settings that have been specified by the camera user. In step 504, a set of automatic settings is determined. The automatic settings are the settings that camera 100 would choose in an "automatic" or "program" mode. In step 505, a second, backup photograph is taken using the automatic settings.

If the camera provides a control for enabling and disabling the taking of backup photographs, then optional step 501 may be used to enable the backup mode. Optional steps and paths are shown in FIG. 5 with broken lines. If camera 100 is configured to take a backup photograph only if the user-specified settings differ significantly from the automatic settings, then optional steps 506 and 507 may be performed. In step 506, the user settings and the automatic settings are compared. In step 507, a decision is made whether there is a significant difference in the two sets of settings. If the user and automatic settings differ significantly, then control passes to step 505 where a second, backup photograph is taken. If the two sets of settings are substantially identical, then step 505 is bypassed and no second, backup photograph is taken.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of photography, comprising the steps of:
   detecting an indication that a photograph is to be taken;
   taking a fat photograph, using user-specified camera settings, in response to the indication that a photograph is to be taken;
   determining a set of automatic camera settings; and
   taking a second photograph, using the automatic camera settings, in response to the same indication that a photograph is to be taken.

2. The method of claim 1, further comprising the step of enabling a mode, the step of determining a set of automatic settings and the step of taking a second photograph using the automatic settings being performed only when the mode is enabled.

3. The method of claim 2 wherein enabling the mode comprises detecting the actuation of a switch.

4. The method of claim 2 wherein enabling the mode is accomplished using a camera user interface comprising a display and controls.

5. The method of claim 1, further comprising comparing the user-specified camera settings with the set of automatic camera settings.

6. The method of claim 5 wherein the step of taking a second photograph using the automatic settings is performed only when the user-specified camera settings differ from the automatic camera setting.

7. The method of claim 5 wherein the step of taking a second photograph using the automatic settings is performed only when the user-specified camera settings differ significantly from the automatic camera settings.

8. The method of claim 1 wherein the indication that a photograph is to be taken is the actuation of a shutter release by a user of a camera.

9. The method of claim 8 wherein the shutter release is a remote shutter release.

10. The method of claim 1 wherein the indication that a photograph is to be taken is provided using a wireless remote control.

11. The method of claim 1, performed in a film camera.

12. The method of claim 1, performed in a digital camera.

13. A camera, comprising:
 a) user controls by which a user of the camera specifies camera settings; and
 b) a control unit that receives input from the user controls, and causes the camera to;
   detect an indication that a photograph is to be taken;
   take a first photograph, using user-specified camera settings, in response to the indication that a photograph is to be taken;
   determine a set of automatic camera settings; and
   take a second photograph, using the automatic camera settings, in response to the same indication that a photograph is to be taken.

14. The camera of claim 13 wherein the camera is a film camera.

15. The camera of claim 13 wherein the camera is a digital camera.

16. The camera of claim 13 wherein the indication that a photograph is to be taken is the actuation of a shutter release.

17. The camera of claim 16 wherein the shutter release is a remote shutter release.

18. The camera of claim 13 wherein the indication that photograph is to be taken is provided using a wireless remote control.

19. The camera of claim 13 wherein the camera compares the user-specified camera settings and the automatic camera settings, and takes the second photograph, using the automatic camera settings, only when the user-specified camera settings and the automatic camera settings differ significantly.

20. The camera of claim 13 wherein the taking of the second photograph, using the automatic camera settings, can be disabled by the user of the camera.

21. A camera that takes two photographs in response to a single indication that a photograph is to be taken, one of the photographs being taken using user-specified camera settings, and the other photograph being taken using camera settings selected automatically by the camera.

22. A camera that, in response to a single indication that a photograph is to be taken,
 takes a photograph using user-specified camera settings;
 determines a sot of automatic camera settings; and
 takes a photograph using the automatic camera settings when the user-specified camera settings and the automatic camera settings differ.

23. A camera that, in response to a single indication that a photograph is to be taken,
 takes a photograph using user-specified camera settings;
 determines a set of automatic camera settings; and
 takes a photograph using the automatic camera settings when the user specified camera settings and the automatic camera settings differ significantly.

24. A method of photography comprising taking two photographs in response to a single indication that a photograph is to be taken, one of the photographs being taken using user-specified camera settings, and the other photograph being taken using camera settings selected automatically by the camera.

25. A method of photography comprising, in response to a single indication that a photograph is to be taken:
 taking a photograph using user-specified camera settings;
 determining a set of automatic camera settings; and
 taking a photograph using the automatic camera settings when the user-specified camera settings and the automatic camera settings differ.

26. A method of photography comprising, in response to a single indication that a photograph is to be taken:
 taking a photograph using user-specified camera settings;
 determining a set of automatic camera settings; and
 taking a photograph using the automatic camera settings when the user-specified camera settings and the automatic camera settings differ significantly.

* * * * *